US012687316B1

(12) United States Patent
Burnett et al.

(10) Patent No.: US 12,687,316 B1
(45) Date of Patent: Jul. 21, 2026

(54) INLINE AIR FILTER APPARATUSES, SYSTEMS AND METHODS

(71) Applicant: Rectorseal, LLC, Houston, TX (US)

(72) Inventors: Gregg W. Burnett, Royse City, TX (US); Joshua Pulis, Leawood, KS (US); Fadi Hurtubise, Dallas, TX (US)

(73) Assignee: RectorSeal, LLC, Houston, TX (US)

( * ) Notice: Subject to any disclaimer, the term of this patent is extended or adjusted under 35 U.S.C. 154(b) by 917 days.

(21) Appl. No.: 17/930,442

(22) Filed: Sep. 8, 2022

(51) Int. Cl.
| | |
|---|---|
| *F24F 11/77* | (2018.01) |
| *B01D 46/00* | (2022.01) |
| *B01D 46/42* | (2006.01) |
| *B01D 46/44* | (2006.01) |
| *F24F 3/16* | (2021.01) |
| *F24F 110/40* | (2018.01) |

(52) U.S. Cl.
CPC .......... *F24F 11/77* (2018.01); *B01D 46/0012* (2013.01); *B01D 46/0043* (2013.01); *B01D 46/0049* (2013.01); *B01D 46/0086* (2013.01); *B01D 46/429* (2013.01); *B01D 46/446* (2013.01); *F24F 3/16* (2013.01); *B01D 2273/10* (2013.01); *B01D 2273/30* (2013.01); *B01D 2279/50* (2013.01); *F24F 2110/40* (2018.01)

(58) Field of Classification Search
None
See application file for complete search history.

(56) References Cited

U.S. PATENT DOCUMENTS

| | | | | |
|---|---|---|---|---|
| 7,261,762 B2 * | 8/2007 | Kang | ................. | B01D 46/0086 |
| | | | | 116/DIG. 25 |
| 7,614,280 B1 * | 11/2009 | Gardner | ................. | A62B 27/00 |
| | | | | 73/863.41 |
| 8,623,117 B2 * | 1/2014 | Zavodny | ............... | B01D 46/42 |
| | | | | 95/25 |

(Continued)

FOREIGN PATENT DOCUMENTS

| | | | | | |
|---|---|---|---|---|---|
| CA | 2390060 C | * | 7/2007 | ............. | B01D 46/62 |
| KR | 100616034 B1 | * | 8/2006 | ....... | H01L 21/67098 |

OTHER PUBLICATIONS

CN-111921118-A abstract, desription, and figure. Published:Nov. 13, 2020, Country: CN, Author: Sun, He-jiang. CPC: F24F13/28 (Year: 2020).*

(Continued)

*Primary Examiner* — Brit E. Anbacht
(74) *Attorney, Agent, or Firm* — Dickinson Wright PLLC

(57) ABSTRACT

Systems and methods compensate for static pressure created by a very high-efficiency air filter in a heating, ventilation and/or air conditioning (HVAC) system by disposing a very high-efficiency air filter in a return to a HVAC system air handling unit (AHU), disposing a variable speed air impeller in the return to the HVAC AHU, and calibrating a speed of the variable speed air impeller to overcome static pressure between the very high-efficiency air filter and the HVAC system AHU created by the very high-efficiency air filter. (An) air pressure sensor(s) may detect the static pressure and/or otherwise provide data to a digital control unit for the digital control unit to calculate the static pressure between the very high-efficiency air filter and the outlet opening, to calibrate the speed of the variable speed air impeller to overcome static pressure between the very high-efficiency air filter and the HVAC system AHU.

15 Claims, 7 Drawing Sheets

(56)      References Cited

U.S. PATENT DOCUMENTS

| | | | | |
|---|---|---|---|---|
| 10,518,206 | B1 * | 12/2019 | Hingorani | B01D 46/0086 |
| 11,253,805 | B1 * | 2/2022 | Jones | B01D 46/0049 |
| 12,044,423 | B2 * | 7/2024 | Dameno | F24F 11/39 |
| 12,419,540 | B2 * | 9/2025 | Yu | A61M 16/06 |
| 12,420,224 | B2 * | 9/2025 | Jones | B01D 46/0049 |
| 2004/0020363 | A1 * | 2/2004 | LaFerriere | B01D 46/0028 |
| | | | | 55/472 |
| 2004/0047776 | A1 * | 3/2004 | Thomsen | F24F 8/22 |
| | | | | 422/186.3 |
| 2005/0247194 | A1 * | 11/2005 | Kang | B01D 46/444 |
| | | | | 95/25 |
| 2007/0068391 | A1 * | 3/2007 | Wiener | B01D 46/0091 |
| | | | | 55/385.2 |
| 2014/0260994 | A1 * | 9/2014 | Grider | B01D 46/44 |
| | | | | 55/467 |
| 2015/0075373 | A1 * | 3/2015 | Miller | B01D 46/446 |
| | | | | 96/400 |
| 2016/0206988 | A1 * | 7/2016 | Bohrer | B01D 46/444 |
| 2021/0346119 | A1 * | 11/2021 | White | A61L 9/122 |
| 2022/0154953 | A1 * | 5/2022 | Herskovitz | F24F 13/081 |
| 2022/0410050 | A1 * | 12/2022 | Jones | B01D 46/0049 |
| 2023/0190982 | A1 * | 6/2023 | Jones | A61L 9/20 |
| | | | | 422/121 |
| 2024/0272654 | A1 * | 8/2024 | Caspers | F26B 11/04 |

OTHER PUBLICATIONS

CN-105928164-A abstract, desription, and figure. Published: Sep. 7, 2016, Country: CN, Author: Li, Xiao-Ping. CPC: F24F11/0001 (Year: 2016).*

* cited by examiner

100

112

THERMOSTAT

INLINE AIR FILTER APPARATUSES, SYSTEMS AND METHODS

TECHNICAL FIELD

The present disclosure relates generally to heating, ventilating and/or air conditioning (HVAC) systems, more particularly to HVAC filtration systems, and specifically to (digitally controlled) inline air filter apparatuses, systems and methods.

BACKGROUND

Heating, Ventilation, and/or Air Conditioning (HVAC) systems are often used to control the ambient temperature within buildings, houses, or other structures. Air cleaners, such as media air filters, are used to protect ductwork and air conditioning systems from dust particles and other contaminants. HVAC and air filtration systems can also serve to improve occupant experience or aid in industrial or medical processes. A variety of air filters are used in heating, ventilating and/or air conditioning (HVAC) systems. A common air filter is a panel filter that uses a spun fiberglass or pleated air filter media. Such filters are relatively inexpensive and provide basic dust protection for ductwork and HVAC system components. Many air filter designs consist of a filter media held by a cardboard frame. Additional support may be provided by a metal screen or cardboard facing, wherein large openings are cut into the cardboard to allow air passage through the filter media. The cardboard facing may be integral to the cardboard frame or may be an additional element of the frame. During use, the air cleaner is typically placed in a frame or holder that aligns the air cleaner with ducting in the HVAC system so that contaminants are removed prior to an air-handling unit.

Modern HVAC systems include a controller or thermostat configured to control one or more components of the HVAC system. For example, a typical thermostat may be used to turn on a fan, set the indoor temperature, or to schedule the system's usage over the course of a day, week, or month.

To wit, FIG. 1 is a diagrammatic illustration of a portion of an example heating, ventilation, and/or air conditioning (HVAC) system 100. An air-handling unit 102 contains, for example, a heating element, an evaporator coil, a recirculation blower, humidifier, and/or other components. Heated or cooled air is provided to locations within a building via supply duct 104(s), which may branch into different rooms and/or floors in the building. Air is received at air-handling unit 102 only via return air duct(s) and/or plenum(s) 106, which is (are) coupled to return registers or vents in the building. Return duct 106 includes an air cleaner housing 108 that holds an air cleaner 110, such as a media air filter. As described above, the air cleaner may be, for example, a fiberglass or polyester pleated filter, or may be a High Efficiency Particulate Air (HEPA) filter (99.98% efficiency rated), an electrostatic air filter, a washable filter, or a synthetic, semi-synthetic, or organic media based filter. The air cleaner traps airborne debris in HVAC system 100 to help protect indoor air quality. To maintain maximum efficiency, the duct network in HVAC system 100 should be a closed system. That means that supply duct(s) 104 and return duct(s) 106 should be sealed from the connection at air-handling unit 102 to the registers that pass the heated or cooled air into the building's rooms. Operation of Air Handling Unit (AHU) 102, and thus system 100, is provided via thermostat 112. Furthermore, some HVAC systems may also include one or more (additional) Indoor Air Quality (IAQ) devices that are useful for regulating the indoor air quality within the building. Typical air filtration technologies may restrict air flow too much, causing problems with HVAC system efficiency and temperature control functions.

SUMMARY

The present invention is directed to systems and methods which compensate for static pressure created by a very high-efficiency air filter in a heating, ventilation and/or air conditioning (HVAC) system by disposing a very high-efficiency air filter in a return to a HVAC system air handling unit (AHU), disposing a variable speed air impeller in the return to the HVAC AHU, and calibrating a speed of the variable speed air impeller to overcome static pressure between the very high-efficiency air filter and the HVAC system AHU created by the very high-efficiency air filter. For example, an inline air filter apparatus having an air filter receptive slot dimensioned to accept a very high-efficiency air filter and a variable speed air impeller, the variable speed air impeller configured to overcome static pressure created by the very high-efficiency air filter. For example, in various aspects an inline air filter apparatus may be an open ended housing having an inlet opening, an outlet opening, and an air filter receptive slot dimensioned to accept a very high-efficiency air filter, with a variable speed air impeller, disposed in the housing, with the variable speed air impeller configured to overcome the static pressure created by the very high-efficiency air filter between the very high-efficiency air filter and the outlet opening. This variable speed air impeller may be disposed (in the housing) between the air filter receptive slot and the outlet opening, or disposed (in the housing) between the inlet opening and the air filter receptive slot.

One or more air pressure sensors may be disposed in the housing and configured to detect the static pressure between the very high-efficiency air filter and the outlet opening and to calibrate speed of the variable speed air impeller to overcome static pressure between the very high-efficiency air filter and the outlet opening. For example, the inline air filter apparatus may be digitally controlled and may include a digital control unit connected to a thermostat and the variable speed air impeller, such that signals from the thermostat are directed to the digital control unit. This digital control unit may calibrate a speed of the variable speed air impeller to overcome static pressure between the very high-efficiency air filter and the outlet opening created by the very high-efficiency air filter. According to such aspects, one or more air pressure sensors may be disposed in the housing and connected to the digital control unit. This/these sensor(s) may detect the static pressure and/or otherwise provide data to the digital control unit for the digital control unit to calculate the static pressure, between the very high-efficiency air filter and the outlet opening, to calibrate the speed of the variable speed air impeller to overcome static pressure between the very high-efficiency air filter and the outlet opening. In various aspects, the digital control unit may calculate a filter service life left of the very high-efficiency air filter, based at least in part on data provided to the digital control unit from the air pressure sensor(s). Additionally, the digital control unit may calculate an operation status of the variable speed air impeller, based at least in part on data provided to the digital control unit from the air pressure sensor(s). In various aspects, the digital control unit may be configured to calibrate the speed of the variable speed air impeller to maintain a(n) (continuous) airflow through the housing, from the inlet opening to the outlet opening. In various aspects, the digital control unit further may include wireless connectivity and the digital control unit may report information about the inline air filter apparatus, via the wireless connectivity. For example, the variable speed air impeller may be configured to maintain static pressure between the very high-efficiency air filter and the outlet opening created by the very high-efficiency air filter in a range of 0.18 to 0.25 inches water column. In various aspects, the digital control unit may determine if the variable speed air impeller is not functioning properly, and/or the very high-efficiency air filter has reached an end of life, and may send a signal to an air handling unit (AHU) coupled to the outlet opening, and/or interrupt a signal from the thermostat to the air handling unit to turn on an air handling fan of the AHU, to not turn on the air handling fan in the AHU.

In various aspects, another air filter receptive slot is dimensioned to accept and retain a prefilter, and the variable speed air impeller, is further configured to overcome static pressure between the very high-efficiency air filter and the outlet opening created by the prefilter and the very high-efficiency air filter.

In various aspects, the housing may include an air bypass passageway and a biased-closed damper configured to open in response to restricted air flow through the housing from the inlet opening to the outlet opening.

In various aspects, one or more of the techniques described herein may be performed using one or more thermostats, HVAC controllers, computer systems, mobile devices, tablets, etc. In other various embodiments, a tangible computer-readable storage medium may have program instructions stored thereon that, upon execution by one or more of the aforementioned systems, cause the system(s) to execute one or more operations disclosed herein. In yet other various embodiments, a system may include at least one processor and memory coupled to the at least one processor, the memory configured to store program instructions executable by the at least one processor to cause the system to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 2:
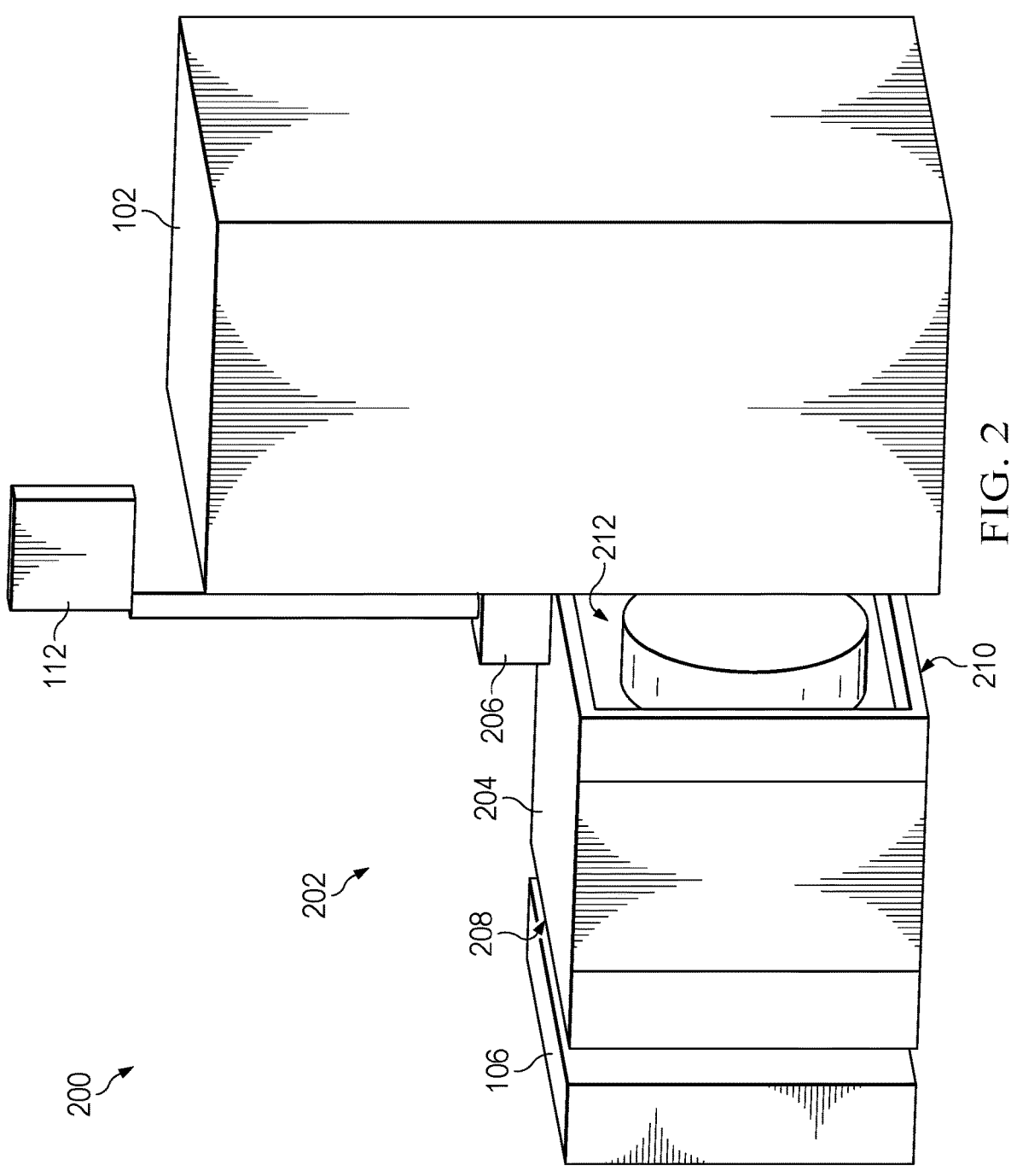
Figure 3:
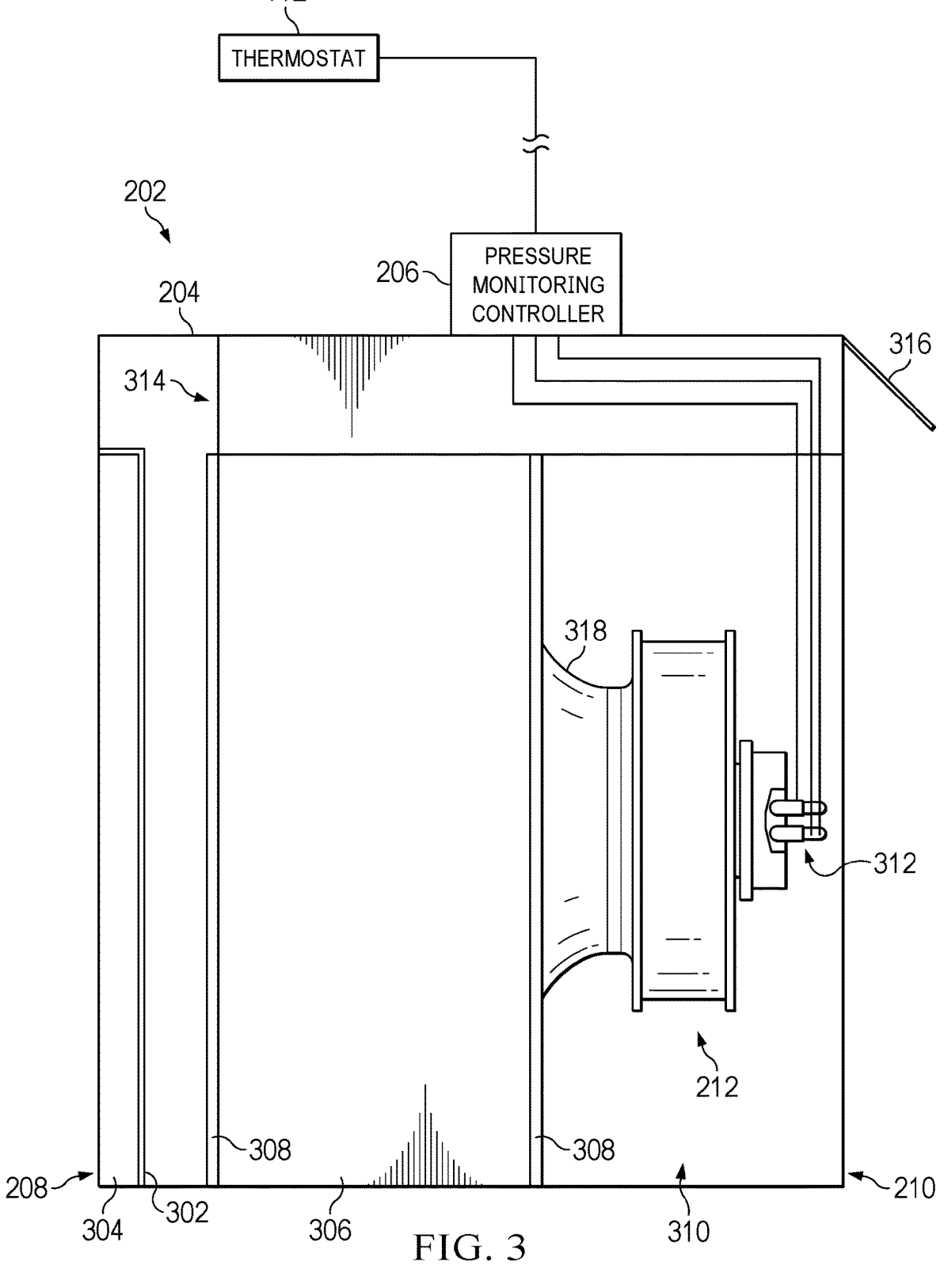
Figure 4:
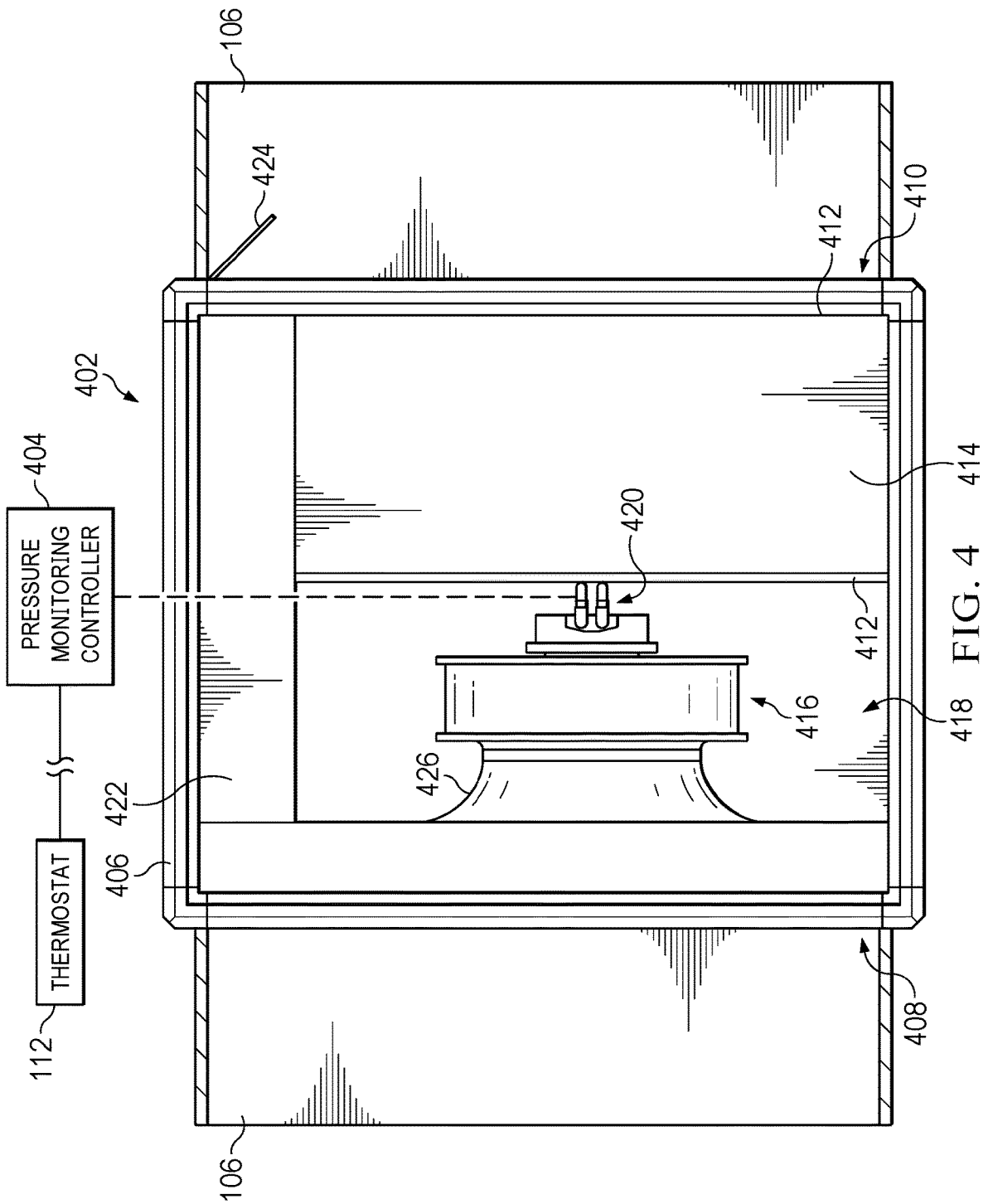
Figure 5:
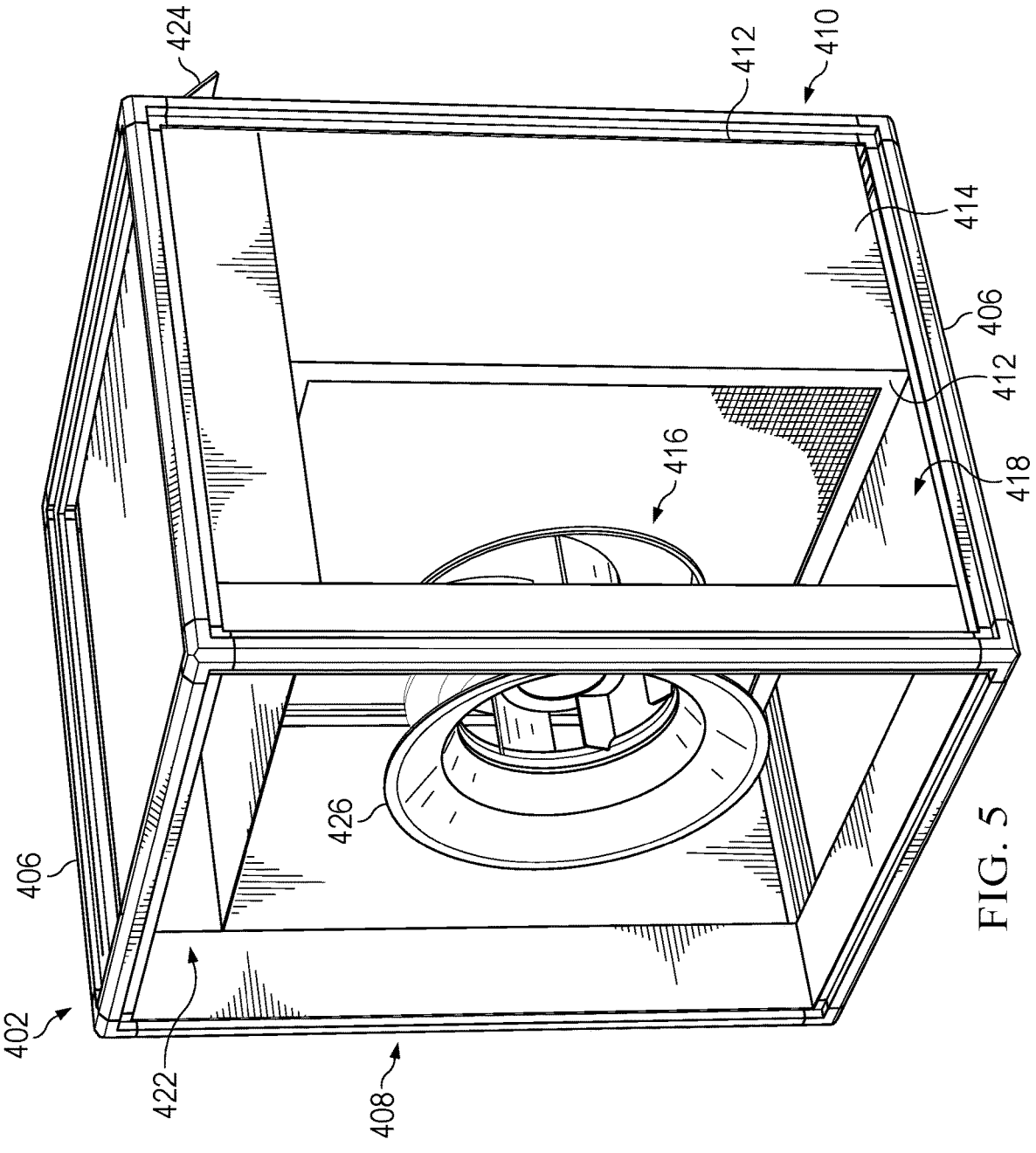
Figure 6:
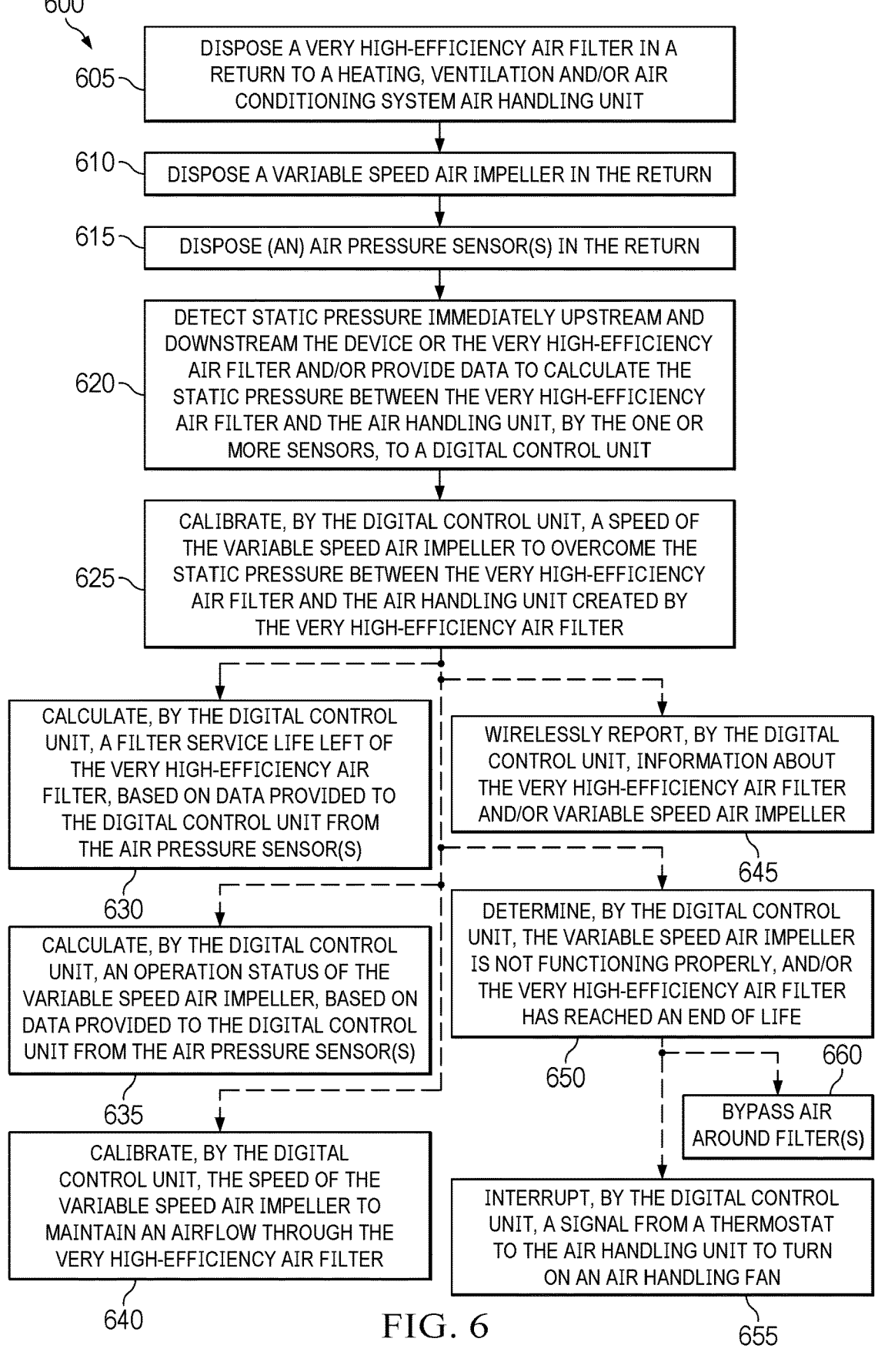
Figure 7:
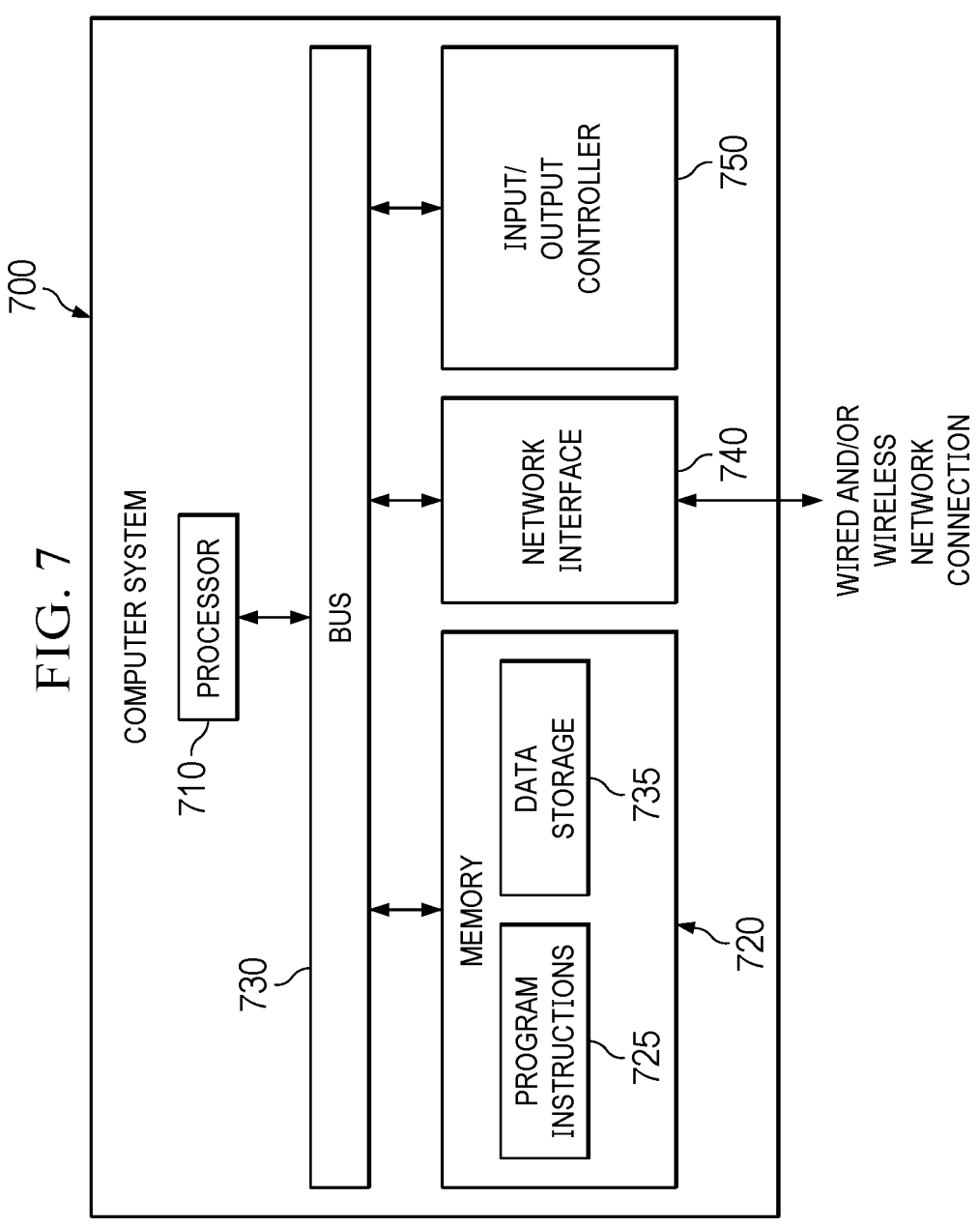

Having thus described the invention in general terms, reference will now be made to the accompanying drawings, which are not necessarily drawn to scale, and wherein:

Figure 1:
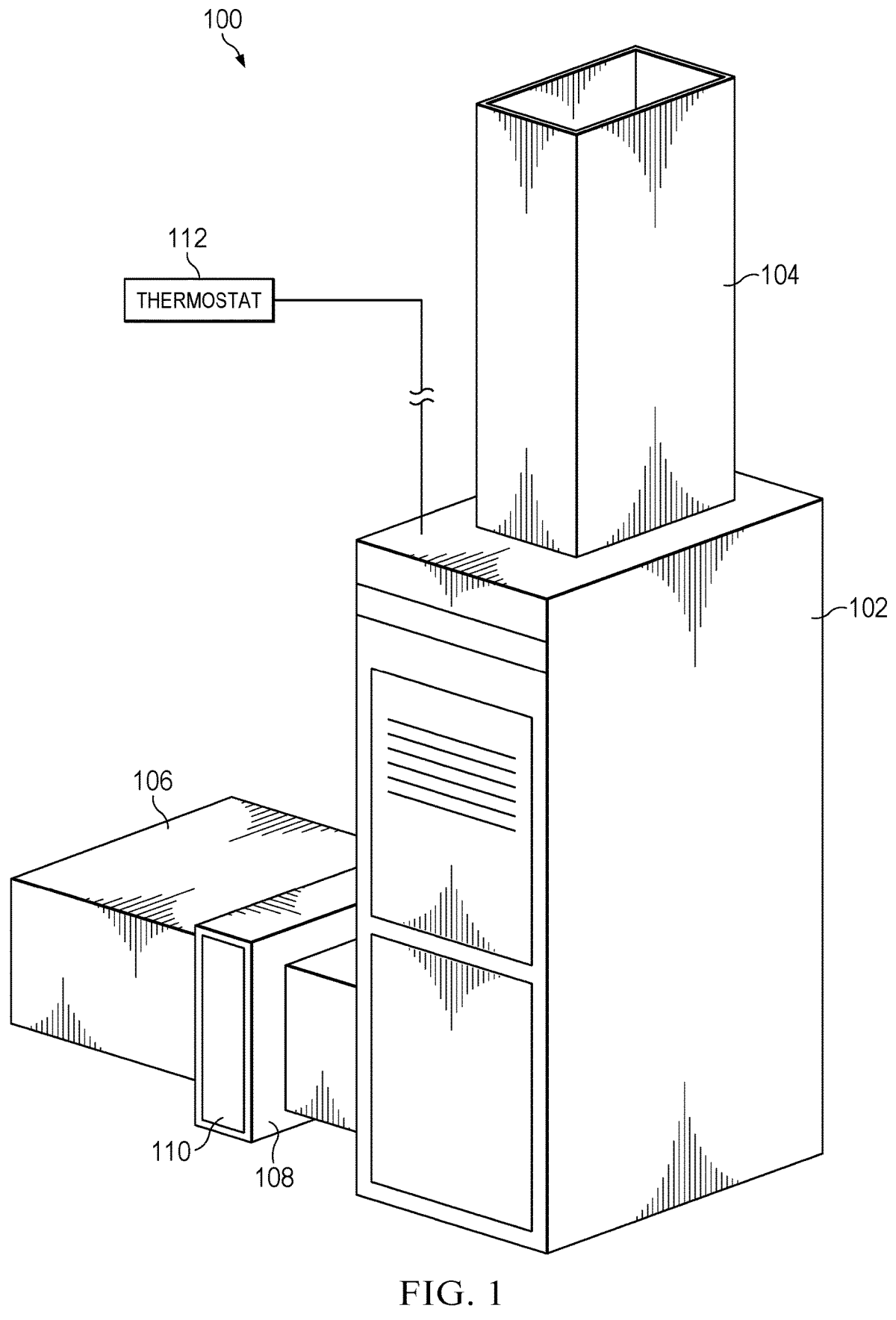

FIG. 1 is a diagrammatic illustration of a portion of an example Heating, Ventilation, and/or Air Conditioning (HVAC) system;

FIG. 2 is a diagrammatic exploded illustration of a portion of an example HVAC system showing deployment of the present (digitally controlled) inline air filter apparatus, according to some embodiments;

FIG. 3 is a diagrammatic partially fragmented, open-sided view of an embodiment of a housing of the present (digitally controlled) inline air filter apparatus and block diagram of the digital inline air filter apparatus controller and thermostat, according to some embodiments;

FIG. 4 is a diagrammatic partially fragmented, open-sided view of another embodiment of a housing of the present (digitally controlled) inline air filter apparatus and block diagram of the digital inline air filter apparatus controller and thermostat, according to some embodiments;

FIG. 5 is a diagrammatic partially fragmented, open-sided perspective view of the other embodiment of FIG. 4 of the present (digitally controlled) inline air filter apparatus, according to some embodiments;

FIG. 6 is a flowchart of a process for digitally controlling an inline air filter apparatus, according to some embodiments; and FIG. 7 is a block diagram depicting certain components of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

An impediment to installing and operating a high efficiency filter, such as a High Efficiency Particulate Air (HEPA) filter (99.98% efficiency rated) in a HVAC system, is the highly resistive choke that the filter imposes on the pressurizing parts of a HVAC system. Without upgrading fans, duct sealing, and other components, a HEPA filter can almost never serve as a single part upgrade without giving attention to the rest of the system in order to support this filter.

Embodiments of the present apparatus, systems and methods relate generally to HVAC systems, more particularly to HVAC filtration systems, and specifically to (digitally controlled) inline air filter apparatuses, systems and methods. Embodiments of the present in-line apparatus promote, and make possible, installation of any filter that might otherwise increase the HVAC system resistance (upstream of the filter) beyond what the HVAC system, particularly an Air Handling Unit (AHU) of the HVAC system, can handle on its own. Embodiments of the present apparatus, systems and methods, employ an impeller and filter arrangement that nullifies inadvisable static air resistance in an HVAC system imposed by the filter. Wherein, the impeller is part of this filter assembly, and that the filter is an air flow restricting filter. For example, while the filter employed in embodiments of the present systems and methods may be a HEPA rated filter, it may alternatively be an electrostatic filter, a spun glass filter, a pleated filter, a current induced metallic fiber filter, a conductive fiber filter, a porous metallic filter, or any other pleat filter whose resistance to air flow imposes a static pressure on an HVAC system that is outside of the originally intended design envelope of the HVAC system. Any such air flow restricting filter which imposes a static pressure outside of the intended design envelope/range of the HVAC system may be referred to herein as a "very high-efficiency air filter," or the like.

Embodiments of the present systems and methods may employ a (digitally controlled) inline air filter apparatus that has an open ended housing with an inlet opening and an outlet opening, which, as discussed below, may be deployed in HVAC ductwork. An air filter receptive slot, or the like, in the housing, or ductwork, is dimensioned (i.e., sized) to accept a very high-efficiency air filter. A variable speed air impeller is disposed in the housing, or ductwork. This variable speed air impeller is configured to overcome static pressure created by the very high-efficiency air filter between the very high-efficiency air filter and the outlet opening.

FIG. 2 is a diagrammatic exploded illustration of a portion of example heating, ventilation, and/or air conditioning (HVAC) system 200 showing deployment of present (digitally controlled) inline air filter apparatus 202, according to some embodiments. As with HVAC system 100, air-handling unit 102 contains, for example, a heating element, an evaporator coil, a recirculation blower, humidifier, and/or other components. Heated or cooled air is provided to locations within a building via supply duct(s) (FIG. 1, 104), which may branch into different rooms and/or floors in the building. Air is received at air-handling unit 102 via return air duct(s) and/or plenum(s) 106, which is coupled to return registers or vents in the building. Return duct 106, in system 200 includes present (digitally controlled) inline air filter apparatus 202.

To maintain maximum efficiency, the duct network in HVAC system 200 is a closed system. Also, a number of air quality problems may arise if the ducts leak, such as poor air quality and increased circulation of dust, dirt and other contaminants in the system, etc. Thus, supply duct(s) 104 and return duct(s) 106 are sealed from the connection to air-handling unit 102 to the registers that pass the heated or cooled air into and out of the building's rooms. A HVAC system may make use of a very high efficiency air filter, such as a HEPA filter, or the like. This very high efficiency air filter traps airborne debris in the HVAC system to help protect indoor air quality. Over time, debris can clog up the air cleaner and the very high efficiency air filter may restrict the air flow within the HVAC system. Restriction to air flow typically caused by a very high efficiency air filter, such as HEPA filter, or the like, and additional restriction to air flow that is caused by the very high efficiency air filter becoming clogged, particularly in light of the closed nature of the system, may result in a differential pressure drop across the air filter, resulting in a static pressure on one or both sides of the air filter. This may present a number of problems in the system, such as increased current draw by the fan or blower of the AHU, overheating of the fan or blower of the AHU, poor air circulation, compromising duct sealing (such as in ducting that was not thoroughly taped), insufficient airflow over a system evaporator coil resulting in icing of the evaporator coil and/or excessively high return coolant pressure (or low return coolant temperature) which may result in compressor strain or damage, or the like, which may be referred to herein as "negative backpressure effects," or the like. As one of skill in the art will appreciate, it is normal to have a healthy level of static pressure in an HVAC system. However, when the static pressure is in an "unhealthy" (i.e., an unintentionally high) range that it becomes a problem. HVAC systems may be defined as "low pressure systems" (<3 inches water column (in WC) during operation), "medium pressure systems" (3 to 6 in WC during operation), and "high pressure systems" (6 to 10 in WC during operation). A "cushion," or a safety factor for the system pressure may also be defined. When this cushion static pressure is surpassed the HVAC system is at risk of being compromised. Embodiments of the present systems and methods may be employed to eliminate, or at least mitigate, such risks.

With the foregoing in mind, attention is additionally directed to FIG. 3, which is a diagrammatic partially fragmented, generally cross-sectional view an embodiment of cabinet or housing 204 of present (digitally controlled) inline air filter apparatus 202, according to some embodiments, with digital inline air filter apparatus controller 206 and thermostat 112 shown coupled thereto, according to some embodiments. Inline air filter apparatus 202, which is configured to be disposed in return duct 106, such as between return duct 106 and AHU 102 (as illustrated), at an air entrance register of return duct 106. as a(n) (inlet) return air plenum of AHU 102, or the like, includes open ended housing 204, to such ends. Open-ended housing 204 defines inlet opening 208 in airflow communication with outside air, such as via return duct 106, as illustrated, or otherwise, such as, at an air entrance register of return duct 106 or as an air inlet, with housing 204 acting as a return air plenum for AHU 102 (without return duct 106). Housing 204 also has outlet opening 210, which is in airflow communication with AHU 102, such as by outlet 210 being directly coupled to an inlet of AHU 102, as illustrated, or when housing 204 is acting as a return air plenum for AHU 102 (without return duct 106), or with a length of return duct disposed between outlet 210 and the inlet of AHU 102.

With attention directed to FIG. 3, housing 204 may define first air filter receptive slot 302 dimensioned (i.e., sized) to accept and retain prefilter 304. Prefilter 304 may be a panel filter that uses a spun fiberglass or polyester pleated media, an electrostatic air filter, a washable filter, etc. As but one specific example, prefilter may be a Minimum Efficiency Reporting Value (MERV) 13 filter, or the like. Prefilter 304 may be a relatively low-efficiency filter intended to act as a prefilter to extend the life of very high-efficiency air filter 306 disposed in second air filter receptive slot 308. Second air filter receptive slot 308 is dimensioned (i.e., sized) to accept very high-efficiency air filter 306, which may be a HEPA air filter, or the like.

Inline air filter apparatus 202 also includes variable speed air impeller 212, disposed in housing 204, between second air filter receptive slot 308 and housing outlet 210, and thus between (replaceable) very high-efficiency air filter 306 disposed in second air filter receptive slot 308 and the inlet of AHU 102 coupled to inline air filter apparatus housing outlet 210. Variable speed air impeller 212, may employ a backward inclined backward curved impeller, a tubeaxial fan, a vaneaxial fan, a two-stage axial-flow fan, a centrifugal fan, an axial-centrifugal fan, or the like, driven by a variable speed impulse motor, or the like. In accordance with embodiments of the present apparatus, systems and methods, variable speed air impeller 212, regardless of the type of fan impeller or motor, is configured to overcome, or at least reduce, static pressure between (replaceable) very high-efficiency air filter 306 and housing outlet 210, (i.e., in pressurized compartment 310) and thus static pressure between (replaceable) very high-efficiency air filter 306 and AHU 102, created by (replaceable) very high-efficiency air filter 306 (and (replaceable) prefilter 304). For example, as noted, restriction to air flow typically caused by a very high efficiency air filter and additional restriction to air flow that is caused by the very high efficiency air filter becoming clogged, particularly in light of the closed nature of an efficient HVAC system, may result in a static pressure between the filter and the AHU. That is, it should be noted that, as one in skill in the art will appreciate, even a brand new very high-efficiency air filter, HEPA or other "resistive filter" may be "too" resistive even when it is brand new, the filter does not necessarily need to be clogged or past its life span to result in and unintentionally high range static pressure. This static pressure caused by a MERV-rated prefilter (304), in combination with very high efficiency air filter (306), such as a HEPA filter, or the like, may be about, by way of example 1.3 inches of static pressure when they are clean and two to three inches of static pressure when they are "loaded" (i.e., clogged by airborne debris in the normal course of operation). This, as also noted, may present a number of problems in the system, such as the aforementioned negative backpressure effects, or the like. Thus, embodiments of the present apparatus, systems and methods employ variable speed air impeller 212 to overcome this static pressure between (replaceable) very high-efficiency air filter 306 and AHU 102 to eliminate, or at least reduce such aforementioned negative backpressure effects, or the like. In some embodiments, controller 206 may be an integral part of the motor of variable speed impeller 212, rather than a separate unit as illustrated.

FIG. 4 is a diagrammatic partially fragmented, generally cross-sectional view of other embodiment 402 of the present (digitally controlled) inline air filter apparatus and block diagram of the digital inline air filter apparatus controller 404 and thermostat 112, according to some embodiments. FIG. 5 is a diagrammatic partially fragmented, perspective view of other embodiment 402 of the present (digitally controlled) inline air filter apparatus, according to some embodiments. Inline air filter apparatus 402 is likewise configured to be disposed in return duct 106, such as between return duct 106 and AHU 102 (as illustrated, with respect to apparatus 202), or, also, at an air entrance register of return duct 106, as a(n) (inlet) return air plenum of AHU 102, or the like. Inline air filter apparatus 402 includes open ended housing 406 to such ends. Open-ended housing 406 defines inlet opening 408 in airflow communication with outside air, such as via return duct 106, or otherwise, such as, at an air entrance register of return duct 106 or as an air inlet, with housing 406 acting as a return air plenum for AHU 102 (without return duct 106). Housing 406 also has outlet opening 410, which is configured to be deployed in airflow communication with AHU 102, such as by outlet 410 being directly coupled to an inlet of AHU 102, or when housing 406 is acting as a return air plenum for AHU 102

(without return duct 106), or with a length of return duct 106 disposed between outlet 410 and the inlet of the AHU, as illustrated. Housing 204 also defines air filter receptive slot 412, dimensioned to accept very high-efficiency air filter 414, which may be a HEPA air filter, or the like disposed therein.

Inline air filter apparatus 402 also includes variable speed air impeller 416, disposed in housing 406, between inlet opening 408 and air filter receptive slot 412, and thus, in pressurized compartment 418. In some embodiments, controller 404 may be an integral part of the motor of variable speed impeller 416, rather than a separate unit, as illustrated. Variable speed air impeller 416, may also employ a backward inclined backward curved impeller, a tubeaxial fan, a vaneaxial fan, a two-stage axial-flow fan, a centrifugal fan, an axial-centrifugal fan, or the like, driven by a variable speed impulse motor, or the like, driven by a variable speed impulse motor, or the like. In accordance with embodiments of the present apparatus, systems and methods, variable speed air impeller 416, regardless of the type of fan impeller or motor, is configured overcome, or at least reduce, static pressure between (replaceable) very high-efficiency air filter 414 and housing outlet 410, and thus static pressure between (replaceable) very high-efficiency air filter 414 and thus AHU 102, created by (replaceable) very high-efficiency air filter 414. For example, as noted, restriction to air flow typically caused by a very high efficiency air filter and additional restriction to air flow that is caused by the very high efficiency air filter becoming clogged, particularly in light of the closed nature of an efficient HVAC system, may result in a static pressure between the filter and the AHU. This static pressure caused by very high efficiency air filter 414, such as a HEPA filter, or the like, may be a low pressure drop, such as, by way of example only, in a residential implementation, about 1.3 in WC of static pressure when it is clean, and a high pressure drop, such as, by way of example only, in the residential implementation, about two to three in WC of static pressure when it is "loaded" (i.e., clogged by airborne debris in the normal course of operation). This, as also noted, may present a number of problems in the system, such as aforementioned negative backpressure effects, or the like. Thus, the present apparatus, systems and methods also employ A variable speed air impeller (416), in embodiment 402 to overcome this static pressure between (replaceable) very high-efficiency air filter 414 and the AHU to eliminate, or at least reduce such negative backpressure effects, or the like. In some embodiments, control unit 404 can be an integral part of the variable speed fan motor.

Housing 406 of (digitally controlled) inline air filter apparatus 402 may also define another air filter receptive slot, or the like, dimensioned to accept and retain a prefilter, between opening 408 and very high-efficiency air filter 414. This prefilter may be a relatively low-efficiency filter intended to act as a prefilter to extend the life of very high-efficiency air filter 414. This prefilter may be a panel filter that uses a spun fiberglass or polyester pleated media, an electrostatic air filter, a washable filter, etc., for example a MERV 13 filter, or the like.

In accordance with various embodiments of the present systems and methods, either of digital control units 206 and 404 are connected to thermostat 112 and the respective variable speed air impeller 212 or 416, such that signals from thermostat 112 are re-directed to the digital control unit, rather than to AHU 102 (i.e., thermostat 112 is wired to respective digital control units 206 or 404, and respective digital control units 206 or 404 is, in turn, wired to AHU 102). Digital control unit 206, 404 is configured to calibrate a speed of variable speed air impeller 212, 416 so as to overcome or reduce static pressure between replaceable very high-efficiency air filter 306, 414 and outlet 210, 410 created by replaceable very high-efficiency air filter 306, 414 (and the replaceable prefilter).

To such ends, (digitally controlled) inline air filter apparatus 202 or 402 includes one or more air pressure sensors 312, 420 disposed in housing 204, 406 and configured to detect the static pressure between very high-efficiency air filter 306, 414 and outlet 210, 410, which may, in some embodiments, directly, or through digital control unit 206, 404, calibrate speed of variable speed air impeller 212, 416 to overcome static pressure between the very high-efficiency air filter 306, 414 and outlet opening 210, 410. For example, in some embodiments the air pressure sensors may be disposed immediately upstream and downstream of the inline air filter apparatus or the very high-efficiency air filter, with these sensors configured to detect the static pressure immediately upstream and downstream of the inline air filter apparatus or the very high-efficiency air filter, to directly, or through the digital control unit, calibrate speed of the variable speed air impeller to overcome the static pressure.

As noted, the one or more air pressure sensors 312, 420 disposed in housing 204, 406 may be connected to digital control unit 206, 404. Th(is)(ese) sensor(s) may be configured to detect the static pressure, and/or provide data to digital control unit 206, 404, for the digital control unit to calculate the static pressure, between very high-efficiency air filter 306, 414 and outlet opening 210, 410, to calibrate the speed of variable speed air impeller 212, 416 to overcome static pressure between very high-efficiency air filter 306, 414 and outlet opening 210, 410. Such that in an inline air filter apparatus 202, 402 employing, by way of example, a HEPA rated filter whose rated static pressure load is limited to 1.0 in WC, the HEPA rated filter imposes an initial increase of 1.0 in WC during steady-state operation of the HVAC system. However, in time, this static pressure continues to increase to above 2.5 additional in WC due to dust loading on the filter. In embodiments of the present systems and methods, the digitally controlled impeller continuously and automatically increases power to offset the static pressure imposed by the resistive air filter, in order to get the total HVAC system pressure back down to, or below, 1.0 in WC. In another example, wherein the inline air filter apparatus employs a low porosity conductive media air filter, whose rated static pressure load is limited to 3.5 in WC, the low porosity conductive media air filter imposes an initial increase of 2.0 in WC during steady-state operation of the HVAC system, and with time, remains at 2.0 in WC. The digitally controlled impeller continuously and automatically maintains power to offset the static pressure imposed by the resistive air filter, in order to get the total HVAC system pressure back down to, or below, 3.5 in WC.

In accordance with embodiments of the present apparatus, systems and methods, digital control unit 206, 404, may also be configured to calculate a filter service life left of the very high-efficiency air filter, based, such as, at least in part, on data provided to the digital control unit from air pressure sensor(s) 312, 420 disposed in housing 204, 406. Additionally, or alternatively, digital control unit 206, 404, may be further configured to calculate an operational status of variable speed air impeller 212, 416, based, such as, at least in part, on data provided to the digital control unit from air pressure sensor(s) 312, 420 disposed in housing 204, 406.

In further embodiments of the present apparatus, systems and methods, the inline air filter apparatus 202, 402 may also be used to (continuously) maintain an airflow through housing 204, 406, when the AHU is not operating. For example, digital control unit 206, 404 may be is further configured to calibrate (and maintain) a speed of variable speed air impeller 212, 416 to (continuously) maintain an airflow through housing 204, 406, from inlet opening 208,408 to outlet opening 210, 410 (e.g., of about 100 to 600 of linear feet per minute of air velocity.

Digital control unit 206, 404, may be further configured, in some embodiments of the present apparatus, systems and methods to determine variable speed air impeller 212, 416 is not functioning properly, and/or that very high-efficiency air filter 306, 414 has reached an end of life. As a result, digital control unit 206, 404, may send a signal to AHU 101 coupled to outlet opening 210, 410, and/or to interrupt a signal from thermostat 112 to the AHU to turn on an air handling fan of the AHU, to not turn on the air handling fan in the AHU, thereby protecting the AHU from damage from lack of airflow. Alternatively, as a result of a determination that variable speed air impeller 212, 416 is not functioning properly, and/or that very high-efficiency air filter 306, 414 has reached an end of life digital control unit 206, 404, may employ bypass 314, 422, discussed below, to protect the AHU from damage from lack of airflow.

Digital control unit 206, 404, may additionally include wireless connectivity. and the digital control unit may be configured to report information about inline air filter apparatus 202, 402, via the wireless connectivity. For example, digital control unit 206, 404, may wirelessly report information about a determination that variable speed air impeller 212, 416 is not functioning properly, that very high-efficiency air filter 306, 414 has reached an end of life, that the digital control unit 206, 404 has interrupted operation of the AHU fan (to protect the AHU fan from damage from lack of air-flow), etc. to a wireless device, such as via an application program (app), wireless device (operating system) notification functionality, or the like.

Various embodiments of the present of the present apparatus, systems and methods may employ an excess pressure reduction system, or the like. For example, in some embodiments inline air filter apparatus housing 204, 406 may further incorporate air bypass passageway 314, 422 and a biased closed damper 316, 424 configured to open in response to restricted air flow through the housing from inlet opening 208, 408 to outlet opening 210, 410, such as caused by restriction of very high-efficiency air filter 306, 414. The very high efficiency filter bypass may be controlled through mechanical, electrical, or any other means. For example, damper 316, 424 may be spring-biased, with the spring calibrated to allow the damper to be "pulled" (or "pushed") open in response to restricted air flow through housing 204, 406. Alternatively, or additionally, a stepper motor, solenoid, valve, or the like, may be controlled by digital control unit 206, 404 (or (directly by) sensors 312, 420) to activate (e.g., open or close) the damper in response to restricted air flow through housing 204, 406. Such solenoid or valve-based damper embodiments may be normally closed (NC) and may only be opened under the exceeded unintentionally high backpressure, per embodiments of the present systems and methods.

Additionally, variable speed air impeller 212, 416 may face toward, or away from, very high-efficiency air filter 306, 414 and may include venturi 318, 426. Also, in accordance with various embodiments of the present apparatus, systems and methods, variable speed air impeller 212, 416 may be further configured, such as via digital control unit 206, 404, and/or input from sensor(s) 312, 420 to (continuously) maintain static pressure between very high-efficiency air filter 306, 414 and outlet opening 210, 410, created by the very high-efficiency air filter (and prefilter) at, or near, zero (e.g., at 0.18 to 0.25 in WC).

FIG. 6 is a flowchart of process 600 to compensate for static pressure created by a very high-efficiency air filter in a HVAC system, such as digitally controlling an inline air filter apparatus (202, 402), according to some embodiments. Therein, at 605 a very high-efficiency air filter (306, 414) and at 610 a variable speed air impeller (212, 416), are disposed in a return (106) to a HVAC AHU (102). At 615, (an) air pressure sensor(s) (312, 420) are disposed in the return, such as, in some embodiments, immediately upstream and downstream of the inline air filter apparatus or the very high-efficiency air filter, with these sensors configured to detect the static pressure immediately upstream and downstream of the inline air filter apparatus or the very high-efficiency air filter. At 620 the sensor(s) detect static pressure immediately upstream and downstream of the inline air filter apparatus or the very high-efficiency air filter, and/or provide data to calculate the static pressure between the very high-efficiency air filter and the HVAC AHU, to a digital control unit (206, 404), to, at 625 calibrate the speed of the variable speed air impeller to overcome the static pressure between the very high-efficiency air filter and the HVAC AHU air handling unit created by the very high-efficiency air filter.

As discussed above, the digital control unit (206, 404) may provide further functionality. For example, at 630, the digital control unit may calculate a filter service life left of the very high-efficiency air filter (306, 414), based, at least in part, on data provided to the digital control unit from the air pressure sensor(s)) (312, 420) disposed in the return. Additionally, or alternatively, the digital control unit may, at 635, calculate an operation status of the variable speed air impeller (212, 416), based, at least in part, on data provided to the digital control unit from the air pressure sensor(s) disposed in the return. Additionally, or alternatively, the digital control unit may, at 640, calibrate the speed of the variable speed air impeller to (continuously) maintain an airflow through the return, and hence, through the very high-efficiency air filter, when the AHU is not running. Additionally, or alternatively, the digital control unit may, at 645 wirelessly report information about the inline air filter apparatus (e.g., the very high-efficiency air filter and/or the variable speed air impeller, to an app, wireless device (operating system) notification functionality, or the like. Additionally, or alternatively, at 650, the digital control unit may determine if the variable speed air impeller is functioning properly, and/or whether the very high-efficiency air filter has reached an end of life. Then at 655, in response to a determination that the variable speed air impeller is not functioning properly, and/or the very high-efficiency air filter has reached an end of life, the control unit sends a signal to the HVAC AHU and/or interrupts a signal from a thermostat to the AHU to turn on the AHU air handling fan, to not turn on the AHU fan. Additionally, the digital control unit may communicate through other means such as electrical, audio, light, or other means of transmission. Alternatively, as a result of a determination that the variable speed air impeller is not functioning properly, and/or that the very high-efficiency air filter has reached an end of life at 650, the digital control unit may at 660, employ a bypass (314, 422), discussed above and below, to protect the AHU from damage from lack of airflow.

Consistent with the description of process 600, embodiments of the present systems and methods may not necessarily need a separate surrounding mechanical support or structure (i.e., may not include housing 204, 406). For example, the very high-efficiency air filter (306, 414) and the variable speed air impeller (212, 416) may be, as noted, set in ductwork, or the like, such as in the return (106), or the like, without the need for a structurally surrounding body.

Consistent with all of the foregoing, embodiments of the present apparatus, systems and methods are regulated by an (on-board) control system (206, 404) that employs feedback monometer functionality, or the like. This pressure monitoring control system (PMCS) (i.e., sensor(s) (312, 420) in combination with the control unit (206, 404)), is monitoring the pressures ahead of, or in the pressurizing compartment(s) (310, 418) and/or after the very high-efficiency air filter (306, 414). The monitoring elements, sensors (e.g., pitot tubes) gauges (incorporated into the control unit (206, 404)) used to sense pressures are preinstalled and routed all within the framework of the present inline air filter apparatus and do not need "up-front" attention of an installer (beyond possible calibration, or the like). This PMCS is configured to analyze pressure drop across the device and make sure that it is held to an acceptable pressure variance. This variance may be a near zero pressure difference. However, in some embodiments of the present systems and methods, the PMCS may always be on, even if the HVAC system is not powered. As the HVAC system powers on or up, the PMCS may sense the backpressure (i.e., static pressure) ahead of the very high-efficiency air filter (and hence between the very high-efficiency air filter and AHU), based, at least in part, on data provided to the digital control unit from the air pressure sensor(s)) (312, 420) disposed in the return. Additionally, or alternatively, the digital control unit may, at 635, calculate an operation status of the variable speed air impeller (212, 416) and sends a signal to the variable speed air impeller (212, 416), to increase speed. This constant feedback system is always signaling to the variable speed air impeller and asking it to operate at a level that is necessary to bring equilibrium to the in-line system. The feedback PMCS and the variable speed air impeller combination serves to counter any added pressure from the very high-efficiency air filter. This may be (especially) important when considering the long-term increase in the static resistance of the very high-efficiency air filter as it gets loaded over time. In accordance with embodiments of the present apparatus, systems and methods, the variable speed air impeller (212, 416) may not operate as strongly when the very high-efficiency air filter is new, compared to when the very high-efficiency air filter is at the end of its service life and loaded with particulates and/or debris.

As noted above, various embodiments of the present of the present apparatus, systems and methods may employ an excess pressure reduction system, or the like. As described above, in the event that the very high-efficiency air filter becomes too resistive, the variable speed air impeller (212, 416) malfunctions, or any other pressure inducing cause begins to add backpressure (i.e., static pressure) to the system, embodiments of the present apparatus may be equipped with a bypassing venting port (passageway 314, 424. A damper (316, 424) may be used within the pathway of the bypass venting port to regulate unnecessary backpressure. This excess pressure reduction system can be operated either by means of mechanical or electronic functionality, as noted above. In the event that the very high-efficiency air filter is neglected, damaged, or otherwise a static pressure load beyond the variable speed air impeller's ability to overcome arises, the bypass damper is opened to relieve the upstream ductwork of all pressure build up. The bypass damper vent relief allows inbound air to circumvent the components of the present inline air filter apparatus and redirects (rather unobstructed) air directly into the outbound ductwork (i.e., to the AHU (102)). This pressure relief passageway may be defined around any one side of the housing, as illustrated, or along two sides three, or all four sides, in accordance with various embodiments. In still further embodiments, an excess pressure reduction system may enable the very high-efficiency air filter (306, 414) and/or variable speed air impeller (212, 416) assembly to swing or linearly move out of the way to allow bypass airflow through the inline air filter apparatus (202, 402).

Additionally, it should be noted that very high-efficiency air filter is, in accordance with embodiments of the present apparatus, systems and methods, replaceable by means of access through the housing (cabinet) (204, 406). such as via a door, or other access, provided to the very high-efficiency air filter receptive slot (308, 412).

The housing (cabinet) (204, 406) may be knockdown, or otherwise disassemble-able. For example, the housing may be a field-assembled air conveyance apparatus made up of a plurality of panels adapted to be field-assembled to form the housing. These panels may be connected in any number of ways, including, by way of example, connected through tubed chassis beams being connected with corner plastic supports that go inside the tubes. Still, the panels of the housing may, in accordance with various embodiments, be manipulated, cut, reshaped, or modified to attach to duct-work, especially those on the inlet and outlet of the housing.

Further, the housing (cabinet) (204, 406) may include various Indoor Air Quality (IAQ) devices or mechanisms. Examples of IAQ devices include, but are not limited to, humidifiers, dehumidifiers, media air cleaners or filters, electronic air cleaners, air ionizers, ultraviolet (UV) air treatment devices or coils, energy recovery ventilators (ERV), heat recovery ventilators (HRV), electronically enhanced air filters, photo catalytic air purifiers, forced air zoning devices, etc. An air purification coating may be disposed on an inner surface the housing, for example, Manganese dioxide, such as in combination with Titanium dioxide, may be used to coat interior surfaces of the housing. Manganese dioxide exhibits thermocatalytic activity for the decomposition of organic pollutants. Coupling Titanium dioxide with Manganese dioxide degrades organics further than Titanium dioxide alone, due to the thermocatalytic activity of Manganese dioxide.

As noted, the present inline air filter apparatus may be digitally controlled, such as by controller or control unit 206 or 404, which may be implemented through programing and/or hardware to implement embodiments of the present systems and methods. This programming may take the form of stored program instructions, programed firmware, or the like, while hardware might take the form of an Application Specific Integrated Circuit (ASIC), or the like, to carry out such aspects of embodiments of the present systems and methods.

Alternatively, controller or control unit 206 or 404, may be implemented, at least in part, by a computer system. One such computer system is illustrated in FIG. 7. In various embodiments, computer system 700 may be a single board computer, or the like. For example, in some cases, computer 700 may implement one or more steps of example process 600 described above with respect to FIG. 6. In various embodiments computer system 700 (i.e., controller 206 or 404) may be configured to communicate in any suitable way, such as, for example, via a public network, which may be the Internet, or the like, as discussed above, via a local area network using wired or wireless functionality, etc.

As illustrated, computer system 700 includes one or more processors 710 (and/or one or more processors having one or more processor cores, a processor with an integrated graphics processor, and/or the like) coupled to a system memory 720 via bus 730. Computer system 700 further includes a network interface 740 coupled to bus 730, and one or more I/O controllers 750, which in turn may provide optional connectivity for peripheral devices, such as for a cursor control device (mouse, trackball, or the like), keyboard, display(s), etc. Such I/O devices may be capable of communicating with I/O controller 750, for example, via a wired connection (e.g., serial port, Universal Serial Bus port) or wireless connection (e.g., Wi-Fi, Bluetooth, Near Field Communications Link, etc.). Other devices may include, for example, microphones, speakers, antennas/wireless transducers, etc.

In various embodiments, computer system 700 may be a single-processor system including one processor 710, or a multi-processor system including two or more processors 710, and/or or cores in one or more processors (e.g., two, four, eight, or another suitable number). Processor(s) 710 may be any processor capable of executing program instructions. For example, in various embodiments, processor(s) 710 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor(s) 710 may commonly, but not necessarily, implement the same ISA. Also, in some embodiments, at least one processor 710 may be, or may include, a graphics processing unit (GPU) or another dedicated graphics-rendering device.

System memory 720 may be configured to store program instructions and/or data accessible by processor 710. In various embodiments, system memory 720 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 720 as program instructions 725 and data storage 735, respectively. In other embodiments, program instructions and/or data may be received, sent, or stored upon different types of computer-accessible media or on similar media separate from system memory 720 or computer system 700.

A computer-accessible medium may include any tangible and/or non-transitory storage media or memory media such as electronic, magnetic, or optical media—e.g., disk or CD/DVD-ROM coupled to computer system 700 via bus 730. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 730 may be configured to coordinate I/O traffic between processor 710, system memory 720, and any peripheral devices in the computer system, including network interface 740 or other peripheral interfaces. In some embodiments, bus 730 may perform any necessary protocol, timing, or other data transformations to convert data signals from one component (e.g., system memory 720) into a format suitable for use by another component (e.g., processor 710). In some embodiments, bus 730 may include support for devices attached through various types of peripheral buses, such as a variant of the Peripheral Component Interconnect (PCI) bus standard or the Universal Serial Bus (USB) standard, for example. In some embodiments, the function of bus 730 may be split into two or more separate components, such as a northbridge chipset and a southbridge chipset, for example. In addition, in some embodiments some or all the functionality of bus 730, such as an interface to system memory 720, may be incorporated directly into processor(s) 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 750 may, in some embodiments, enable communications with one or more display terminals, keyboards, keypads, touchpads, scanning devices, voice or optical recognition devices, mobile devices, or any other devices suitable for entering or retrieving data by one or more computer system 700. Multiple I/O controllers 750 may be present in computer system 700 or may be distributed on various nodes of computer system 700. In some embodiments, I/O devices may be separate from computer system 700 and may interact with one or more nodes of computer system 700 through a wired or wireless connection, such as over network interface 740.

As shown in FIG. 7, system memory 720 may include program instructions 725, configured to implement certain embodiments described herein, and data storage 735, comprising various data may be accessible by program instructions 725. In an embodiment, program instructions 725 may include software elements, which may be configured to affect the operations discussed in FIGS. 1 through 7. Program instructions 725 may be implemented in various embodiments using any desired programming language, scripting language, or combination of programming languages and/or scripting languages (e.g., C, C++, C#, JAVA®, JAVASCRIPT®, PERL®, etc.). Data storage 735 may include data that may be used in these embodiments (e.g., recorded communications, profiles for different modes of operations, etc.). In other embodiments, other or different software elements and data may be included.

A person of ordinary skill in the art will appreciate that computer system 700 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various operations described herein, particularly in connection with FIGS. 3 through 7, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

Although certain embodiments are described herein with reference to specific examples, numerous modifications and changes may be made in light of the foregoing description. Accordingly, the specification and figures are to be regarded in an illustrative rather than a restrictive sense, and all such modifications are intended to be included within their scope. Any benefits, advantages, or solutions to problems that are described herein with regard to specific embodiments are not to be construed as a critical, required, or essential feature or element of any or all the claims. Furthermore, it should be understood that the various operations described herein may be implemented in software, hardware, or a combination thereof. The order in which each operation of a given technique is performed may be changed, and the elements of the systems illustrated herein may be added, reordered, combined, omitted, modified, etc. It is intended that the embodiments described herein embrace all such modifications and changes and, accordingly, the above description should be regarded in an illustrative rather than a restrictive sense.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Unless stated otherwise, terms such as "first" and "second" are used to arbitrarily distinguish between the elements such terms describe. Thus, these terms are not necessarily intended to indicate temporal or other prioritization of such elements. The term "coupled" is defined as "connected" and/or "in communication with," although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

What is claimed is:

1. An inline air filter system comprising:

an air handling unit including an air handling fan disposed within the air handling unit; and an inline air filter apparatus comprising:

an open ended housing comprising:

an inlet opening;

an outlet opening;

an air filter receptive slot dimensioned to accept a very high-efficiency air filter;

a variable speed air impeller configured to overcome static pressure created by the very high-efficiency air filter between the very high-efficiency air filter and the outlet opening;

wherein the variable speed air impeller is disposed within the open ended housing and positioned between the air handling fan of the air handling unit and the very-high efficiency air filter.

2. The inline air filter system of claim 1, wherein the variable speed air impeller is disposed in the housing between the air filter receptive slot and the outlet opening.

3. The inline air filter system of claim 1, wherein the variable speed air impeller is disposed in the housing between the inlet opening and the air filter receptive slot.

4. The inline air filter system of claim 1, further comprising one or more air pressure sensors disposed in the housing and configured to detect the static pressure between the very high-efficiency air filter and the outlet opening and to calibrate speed of the variable speed air impeller to overcome static pressure between the very high-efficiency air filter and the outlet opening.

5. The inline air filter system of claim 1, wherein the inline air filter apparatus is digitally controlled and further comprises a digital control unit connected to a thermostat and the variable speed air impeller, signals from the thermostat directed to the digital control unit, the digital control unit configured to calibrate a speed of the variable speed air impeller to overcome static pressure between the very high-efficiency air filter and the outlet opening created by the very high-efficiency air filter.

6. The inline air filter system of claim 5, further comprising one or more air pressure sensors disposed in the housing and connected to the digital control unit, the one or more sensors configured to detect the static pressure, and/or provide data to the digital control unit for the digital control unit to calculate the static pressure, between the very high-efficiency air filter and the outlet opening, to calibrate the speed of the variable speed air impeller to overcome static pressure between the very high-efficiency air filter and the outlet opening.

7. The inline air filter system of claim 6, wherein the digital control unit is further configured to calculate a filter service life left of the very high-efficiency air filter, based at least in part on data provided to the digital control unit from the one or more air pressure sensors disposed in the housing.

8. The inline air filter system of claim 6, wherein the digital control unit is further configured to calculate an operation status of the variable speed air impeller, based at least in part on data provided to the digital control unit from the one or more air pressure sensors disposed in the housing.

9. The inline air filter system of claim 5, wherein the digital control unit is further configured to calibrate the speed of the variable speed air impeller to maintain an airflow through the housing, from the inlet opening to the outlet opening.

10. The inline air filter system of claim 5, wherein the digital control unit further comprises wireless connectivity and the digital control unit is further configured to report information about the inline air filter apparatus, via the wireless connectivity.

11. The inline air filter system of claim 5, wherein the digital control unit is further configured to determine the variable speed air impeller is not functioning properly, and/or the very high-efficiency air filter has reached an end of life, and to send a signal to an air handling unit coupled to the outlet opening, and/or to interrupt a signal from the thermostat to the air handling unit to turn on an air handling fan of the air handling unit, to not turn on the air handling fan in the air handling unit.

12. The inline air filter system of claim 1, further comprising another air filter receptive slot dimensioned to accept and retain a prefilter, and—wherein the variable speed air impeller is further configured to overcome static pressure between the very high-efficiency air filter and the outlet opening created by the prefilter and the very high-efficiency air filter.

13. The inline air filter system of claim 1, wherein the housing further comprises an air bypass passageway and a biased-closed damper configured to open in response to restricted air flow through the housing from the inlet opening to the outlet opening.

14. The inline air filter system of claim 1, wherein the variable speed air impeller is further configured to maintain static pressure between the very high-efficiency air filter and the outlet opening created by the very high-efficiency air filter in a range of 0.18 to 0.25 inches water column.

15. An inline air filter system comprising:

an air handling unit including an air handling fan disposed within the air handling unit; and an inline air filter apparatus comprising:

an open ended housing comprising:

an inlet opening;

an outlet opening;

an air filter receptive slot dimensioned to accept a very high-efficiency air filter;

a variable speed air impeller to overcome static pressure created by the very high-efficiency air filter between the very high-efficiency air filter and the outlet opening;

wherein the variable speed air impeller is disposed within the open ended housing and positioned between the inlet opening and the very-high efficiency air filter.

\* \* \* \* \*